C. H. J. DILG & J. O. FOWLER.
CAKE OF SOAP.
APPLICATION FILED FEB. 20, 1907.
945,495.
Patented Jan. 4, 1910.
2 SHEETS—SHEET 1.
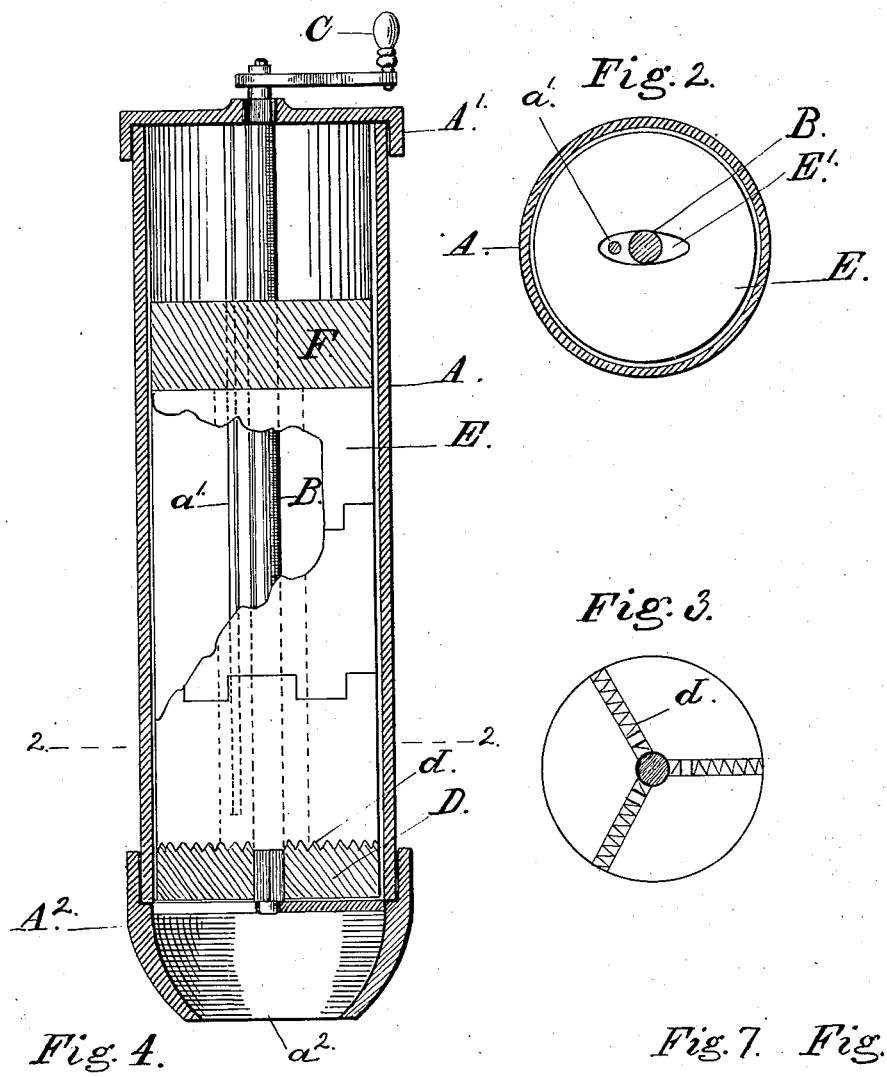
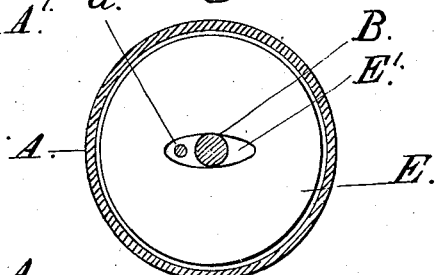
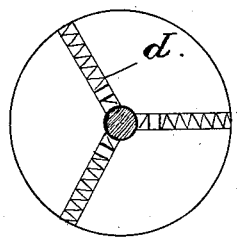
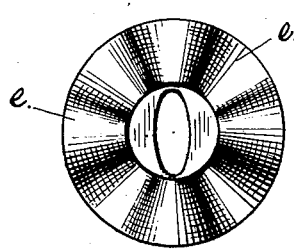
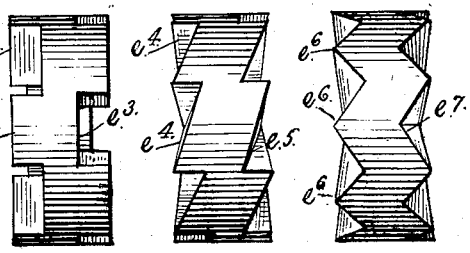

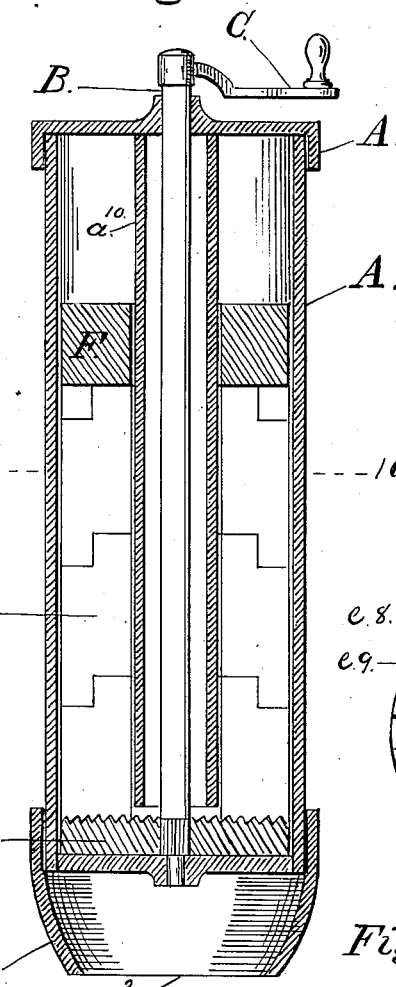
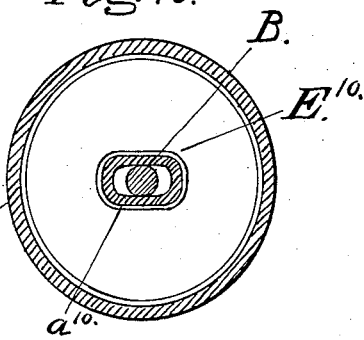
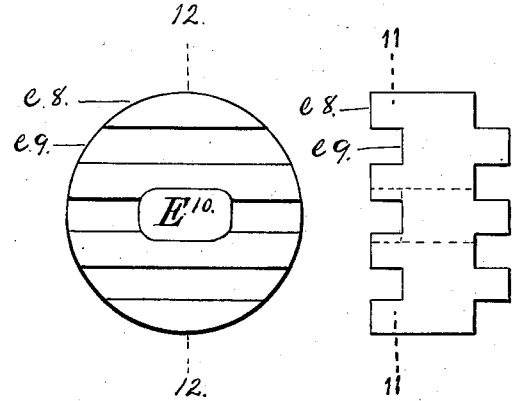
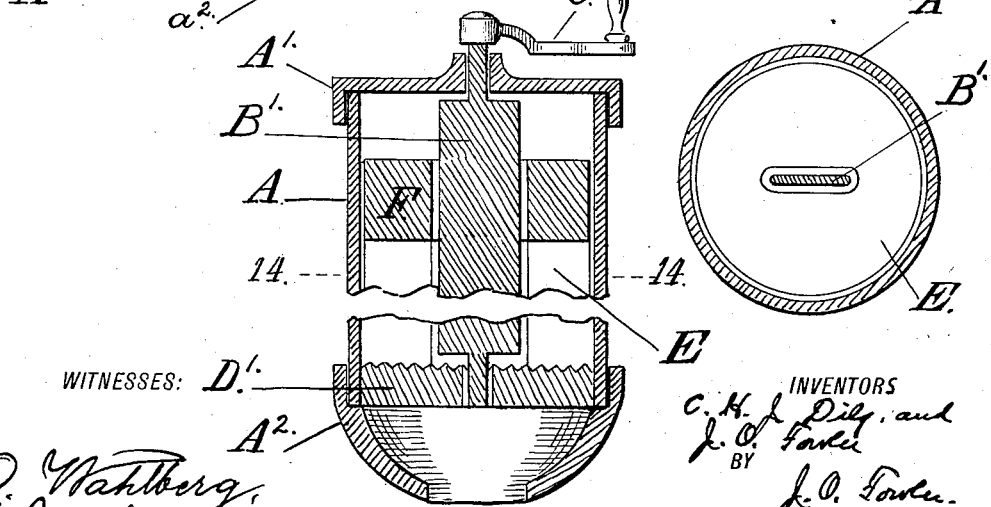

UNITED STATES PATENT OFFICE.

CHARLES H. J. DILG AND JONATHAN O. FOWLER, OF NEW YORK, N. Y.

CAKE OF SOAP.

945,495.  Specification of Letters Patent.  Patented Jan. 4, 1910.

Application filed February 20, 1907. Serial No. 358,412.

*To all whom it may concern:*

Be it known that we, CHARLES H. J. DILG and JONATHAN O. FOWLER, citizens of the United States of America, and residents of New York, in the county and State of New York, have invented a certain new and useful Cake of Soap, of which the following is a specification, the same being a full, clear, and exact description of the invention, such as will enable others skilled in the art to which it appertains to make and use the same.

This invention relates to cakes of soap adapted to be used in apparatuses by means of which solid blocks of material may be disintegrated and furnished for use in the form of fine shavings or in a comminuted condition, and it has for its object the provision of a cake of soap that may be used in the desired manner.

With this object in view, the invention consists in certain novel features of construction and arrangement of parts, all of which will be hereinafter described and specifically pointed out in the drawings which accompany and form a part of this specification, and in which—

Figure 1 represents a sectional view of a machine constructed and arranged to contain and disintegrate a soap cake constructed according to our invention; Fig. 2 is a transverse section of the same, taken on the line 2, 2, Fig. 1; Fig. 3 is a plan view of the serrated top face of the cutter; Fig. 4 is a plan view and Fig. 5 an elevation of a cake of soap in which our invention is embodied; Figs. 6, 7, and 8 are elevations of other cakes of soap constructed according to our invention, showing the various styles of interlocking devices we prefer to use; Fig. 9 is a sectional view of another machine constructed and arranged to contain and disintegrate or comminute a cake of soap constructed according to our invention; Fig. 10 is a transverse section of the same taken on the line 10, 10, Fig. 9; Fig. 11 is a section of a soap cake in which our invention is embodied, taken on the line 11, 11, Fig. 12; Fig. 12 is a section of the same taken on the line 12, 12, Fig. 11; Fig. 13 is a sectional view of still another machine adapted to disintegrate a cake of soap constructed according to our invention; and Fig. 14 is a view in section taken on the line 14, 14, Fig. 13.

Like letters of reference indicate like parts in all the views.

Referring particularly by reference symbols or characters to the drawings, A denotes the preferably cylindrical body portion of a machine constructed and arranged to cut away the soap in such a manner that the resultant product will be in a comminuted condition, and preferably in the form of fine ribbons or shavings. The said body portion A is surmounted by an upper cap or head A', to which is affixed a soap retaining member consisting of a rod $a'$, and a lower cap or bottom portion $A^2$, having preferably a contracted delivery spout or opening $a^2$. A rod or spindle B, carrying a handle C, and a cutter D is constructed and arranged to rotate within the casing of the machine, each serration $d$ of which cutter is ordinarily inclined upward from the horizontal plane of the cutter, so as to form an acute angle therewith.

Each one of the cakes of soap E is made of such construction that it may be readily inserted into the machine, and when the cake of soap is partially used, a new cake may be placed in the machine on top of the first cake, and to that end, the said cakes E are provided, preferably at each end, with means to detachably and interchangeably interlock with each other without deformation, as projecting portions $e, e^2, e^4, e^6$, and $e^8$, and intermediate recesses $e^1, e^3, e^5, e^7$, and $e^9$, as shown in Figs. 4, 5, 6, 7, 8, 11 and 12.

Each one of the preferably cylindrical cakes of soap is provided with an ordinarily central opening constructed and arranged to coact with and engage with the retaining member of the soap supplier in order to prevent the rotation of the soap cakes, and also to serve as a means of allowing the rod or spindle carrying the cutter to pass therethrough. In Fig. 2, the said central, non-circular opening is shown at E', within which opening is located the rod $a'$, rigidly secured to the head or cap A', and the spindle B; and in Figs. 10 and 12, the said central non-circular opening is represented at $E^{10}$, within which opening is located the tube $a^{10}$, rigidly fastened to the head or cap A', and the rod or spindle B.

By operating the handle of the machine, the soap cake will be gradually worn away by the action of the cutter, and the resultant product delivered in the form of fine shavings or ribbons; and as the cakes are interlocked, the cutter will begin to cut on the new cake before the old cake is entirely used up, the remaining parts of the old cake being prevented from moving by reason of being interlocked with the new cake superimposed thereon, the whole soap body, formed of a plurality of cakes of soap, being prevented from rotating in unison with the cutter by the retaining members $a'$ or $a^{10}$.

The cakes of soap may be made of any length desired, and although we show a number of soap cakes in one machine, it is manifest that each cake of soap may be of approximately the length of the casing of the machine, if preferred.

If desired, the action of the cutter, in disintegrating or comminuting the cakes of soap, may be rendered more steady and reliable by means of a device to force the same against the cutter, as a weight F placed on top of the upper cake of soap.

In the machine shown in Figs. 13 and 14, the spindle B' is formed with flat faces constructed and arranged to work within the casing A, the lower end of the said spindle being supported by, and working in a bearing formed in the stationary cutter D'. In this instance the cake of soap is formed with an oblong orifice slightly larger than the central portion of the spindle B', and the cake of soap and the spindle rotate simultaneously, while the soap cake and the cutter are prevented from rotating in unison.

As it is evident that many changes in the construction, form, proportion and relative arrangement of parts might be resorted to without departing from the spirit and scope of our invention, we would have it understood that we do not restrict ourselves to the particular construction and arrangement of parts shown and described, but that such changes and equivalents might be substituted therefor, and that

What we claim as our invention is:—

1. A cake of soap adapted for use in a soap shaving machine to disintegrate soap by the action of a cutter and having a series of alternate projecting portions and recesses on one end, and formed with a central abutting portion on the said end whose face lies in a plane other than the planes of the faces of the said projecting portions or recesses.

2. A cake of soap adapted for use in a soap shaving machine to disintegrate soap by the action of a cutter and having a series of alternate projecting portions and recesses on both ends, and formed with a central abutting portion on each end whose face lies in a plane other than the planes of the faces of the said projecting portions or recesses.

3. A cake of soap adapted for use in a machine to disintegrate soap by the action of a cutter and having a portion thereof adapted, without deformation, detachably to interlock with a second cake, and formed with a central opening therein to afford a means to engage a device to prevent the cake and cutter from rotating in unison during the process of cutting.

4. A cake of soap adapted for use in a machine to disintegrate soap by the action of a cutter and having a portion thereof adapted, without deformation, detachably to interlock with a second cake, and formed with a non-circular central opening therein to afford a means to engage a device to prevent the cake and cutter from rotating in unison during the process of cutting.

5. A cake of soap adapted for use in a machine to disintegrate soap by the action of a cutter and having one end thereof adapted, without deformation, detachably to interlock with an end of a second cake, and formed with a central opening therein to afford a means to engage a device to prevent the cake and cutter from rotating in unison during the process of cutting.

6. A cake of soap adapted for use in a machine to disintegrate soap by the action of a cutter and having one end thereof adapted, without deformation, detachably to interlock with an end of a second cake, and formed with a non-circular central opening therein to afford a means to engage a device to prevent the cake and cutter from rotating in unison during the process of cutting.

7. A cake of soap adapted for use in a machine to disintegrate soap by the action of a cutter and having opposite ends thereof adapted detachably to interlock with the end of a second cake, and formed with a central opening therein to afford a means to engage a device to prevent the cake and cutter from rotating in unison during the process of cutting.

8. A cake of soap adapted for use in a machine to disintegrate soap by the action of a cutter and having opposite ends thereof adapted detachably to interlock with the end of a second cake, and formed with a non-circular central opening therein to afford a means to engage a device to prevent the cake and cutter from rotating in unison during the process of cutting.

9. A cake of soap adapted for use in a machine to disintegrate soap by the action of a cutter and having opposite ends thereof interchangeably adapted to interlock with either end of a second cake, and formed with a central opening therein to afford a means to engage a device to prevent the cake and cutter from rotating in unison during the process of cutting.

10. A cake of soap adapted for use in a machine to disintegrate soap by the action of a cutter and having opposite ends thereof interchangeably adapted to interlock with either end of a second cake, and formed with a central non-circular opening therein to afford a means to engage a device to prevent the cake and cutter from rotating in unison during the process of cutting.

11. A cake of soap adapted for use in a soap shaving machine to disintegrate soap by the action of a cutter and having a series of alternate projecting portions and recesses on one end, and formed with a central abutting portion on the said end whose face lies in a plane other than the planes of the faces of the said projecting portions or recesses, the said cake being also formed with a central opening therein to afford a means to engage a device to prevent the cake and cutter from rotating in unison during the process of cutting.

In testimony of the foregoing specification, we do hereby sign the same in the city of New York, county and State of New York, this 14th day of February, 1907.

CHARLES H. J. DILG.
JONATHAN O. FOWLER.

Witnesses:
ROB. SCHWARZ,
BENJ. F. HOARD.